(12) United States Patent
Valcamp et al.

(10) Patent No.: US 7,815,350 B2
(45) Date of Patent: Oct. 19, 2010

(54) HEADLAMP WITH BEAM PATTERNS FORMED FROM SEMICONDUCTOR LIGHT SOURCES

(75) Inventors: David J. Valcamp, Frankford (CA); Ronald O. Woodward, Yorktown, VA (US)

(73) Assignee: Magna International Inc., Aurora (CA)

( * ) Notice: Subject to any disclaimer, the term of this patent is extended or adjusted under 35 U.S.C. 154(b) by 139 days.

(21) Appl. No.: 12/150,865

(22) Filed: May 1, 2008

(65) Prior Publication Data

US 2008/0316759 A1 Dec. 25, 2008

Related U.S. Application Data

(63) Continuation-in-part of application No. 11/827,283, filed on Jul. 11, 2007, now Pat. No. 7,563,009, which is a continuation of application No. 11/111,534, filed on Apr. 21, 2005, now Pat. No. 7,258,474.

(51) Int. Cl.
    *B60Q 1/00* (2006.01)
(52) U.S. Cl. ............ 362/507; 362/511; 362/545; 362/551; 362/555; 362/800
(58) Field of Classification Search ............ 362/507, 362/511, 521, 545, 551, 554, 555, 800; 359/642, 359/809
    See application file for complete search history.

(56) References Cited

U.S. PATENT DOCUMENTS

| 4,389,698 | A | 6/1983 | Cibie |
|---|---|---|---|
| 4,949,227 | A | 8/1990 | Finch et al. |
| 5,222,793 | A | 6/1993 | Davenport et al. |
| 5,436,806 | A | 7/1995 | Kato |
| 5,931,576 | A | 8/1999 | Kreysar et al. |
| 6,152,588 | A | 11/2000 | Scifres |
| 6,371,635 | B2 | 4/2002 | Ott et al. |
| 6,406,172 | B1 | 6/2002 | Harbers et al. |
| 6,491,420 | B1 | 12/2002 | Scifres |
| 7,258,474 | B2 | 8/2007 | Valcamp et al. |
| 2004/0149998 | A1 | 8/2004 | Henson et al. |
| 2004/0223337 | A1 | 11/2004 | Ishida |
| 2006/0239024 | A1 | 10/2006 | Valcamp et al. |

FOREIGN PATENT DOCUMENTS

| DE | 103 12 950 | 10/2004 |
|---|---|---|
| DE | 10 2005 041234 A1 | 3/2007 |
| WO | WO 2007/027474 A | 3/2007 |
| WO | WO 2007/062277 A1 | 5/2007 |

*Primary Examiner*—Sandra L O'Shea
*Assistant Examiner*—Meghan K Dunwiddie
(74) *Attorney, Agent, or Firm*—Warn Partners, P.C.; Marc Luddy

(57) ABSTRACT

Headlamp systems are provided that form desired beam patterns from light supplied by semiconductor light sources. The present invention is headlamp system for a vehicle including at least one first light source, at least one second light source, and a first lens system having at least one lens operably associated with the at least one first light source to provide a spread portion of a desired beam pattern. The present invention also includes second lens system having at least one lens operably associated with the at least one second light source to provide a hot spot portion of the desired beam pattern.

50 Claims, 14 Drawing Sheets

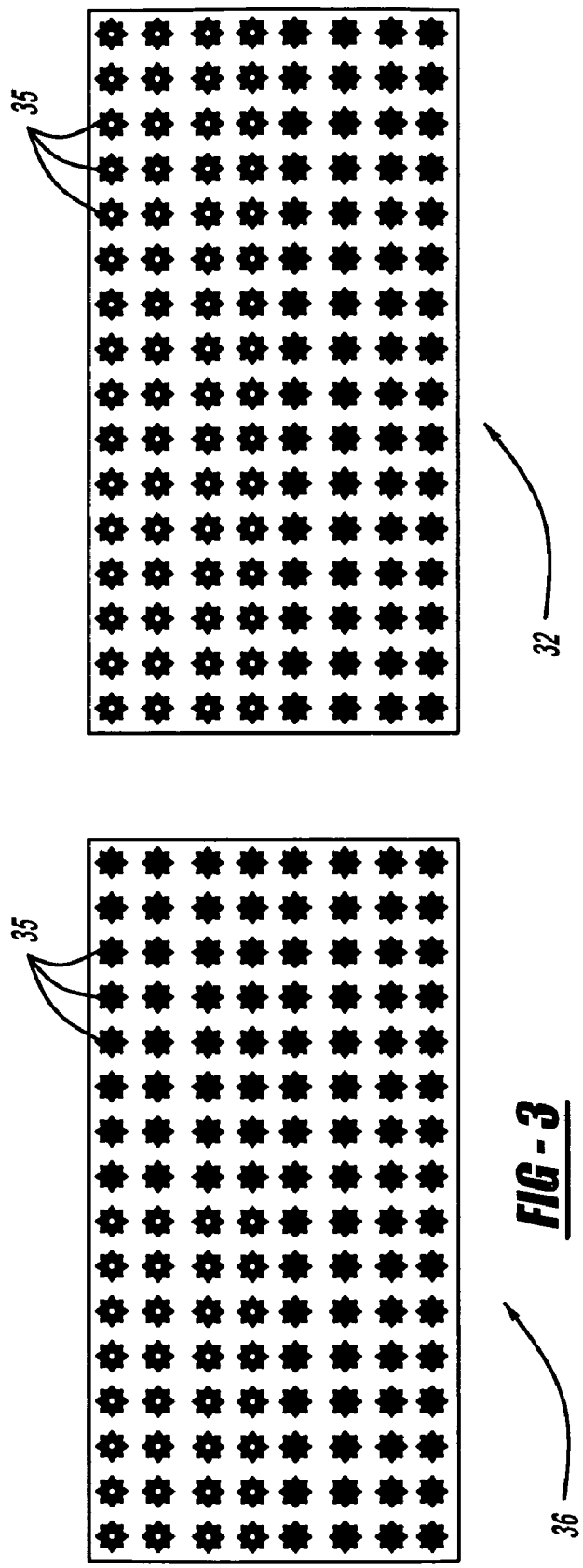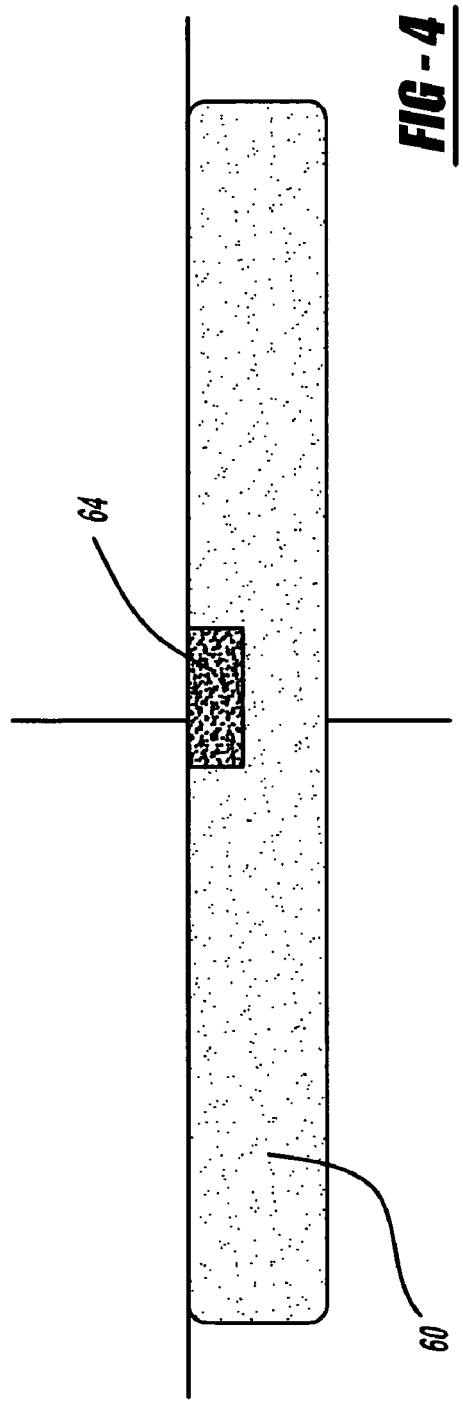

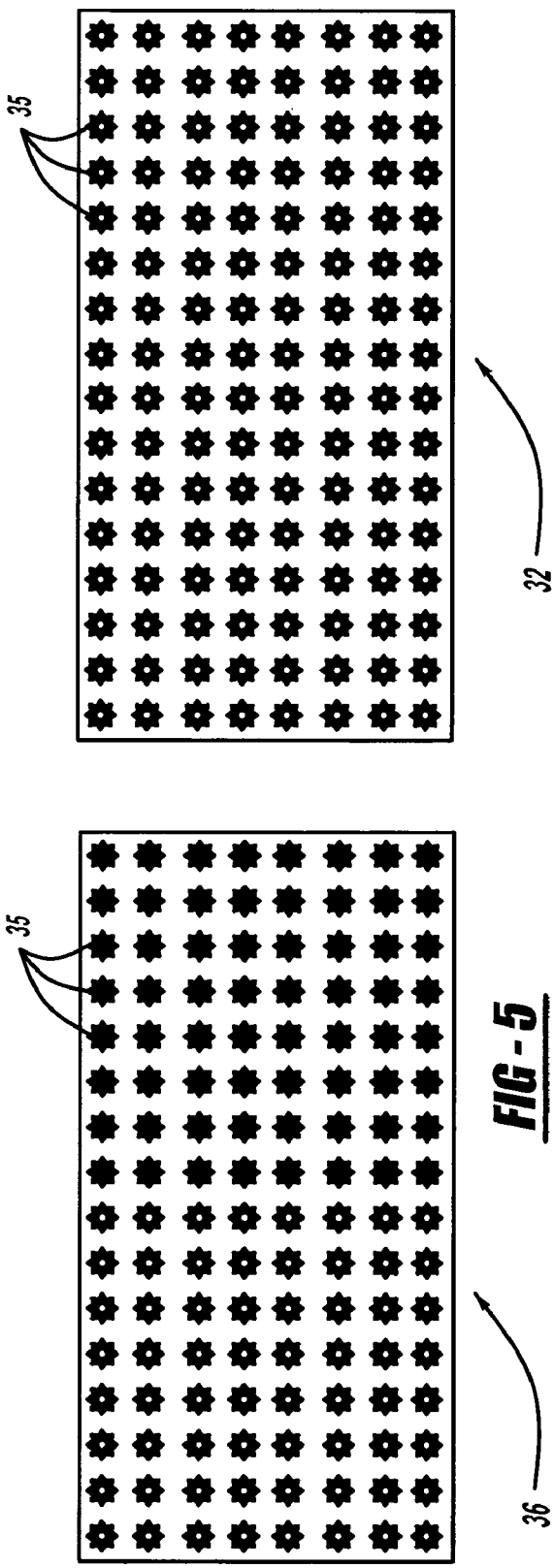

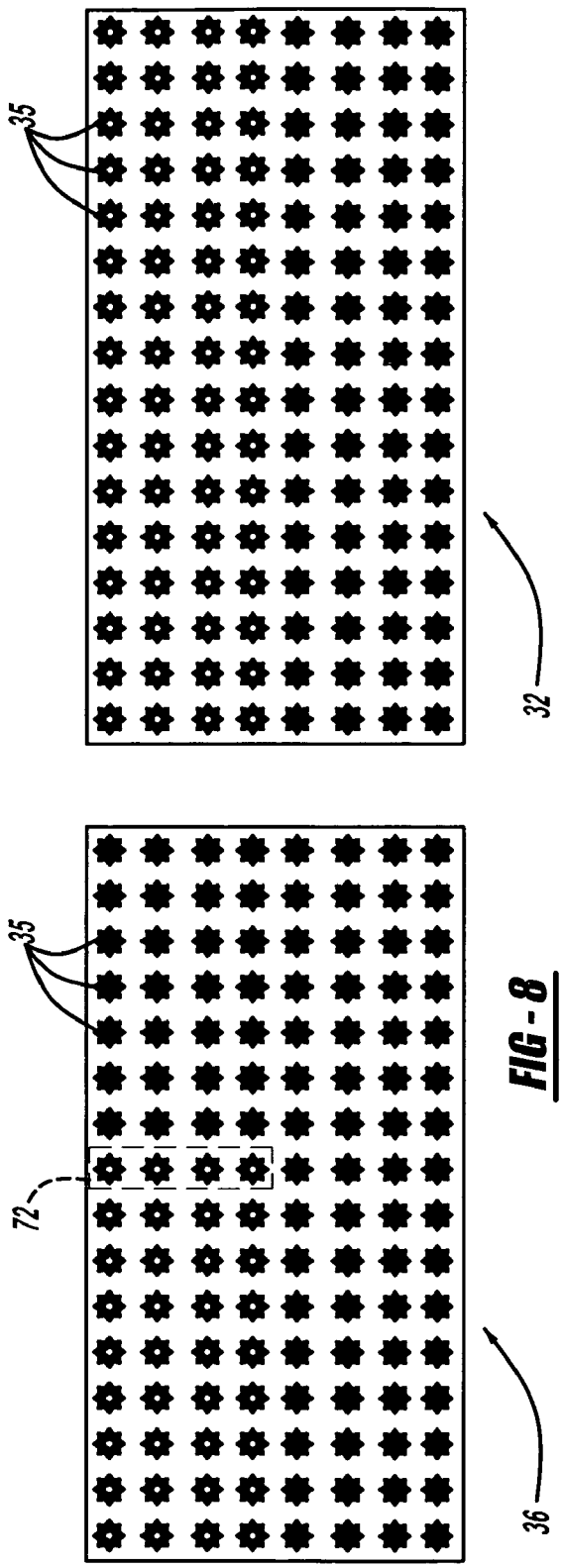

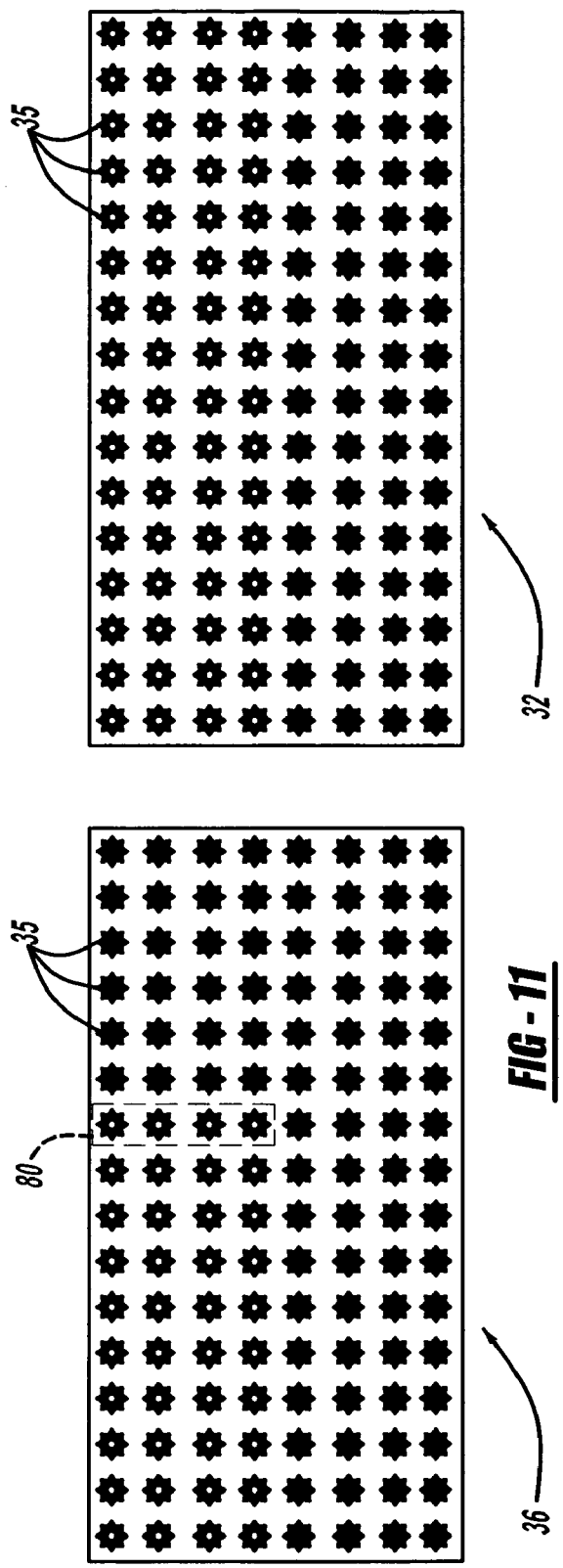

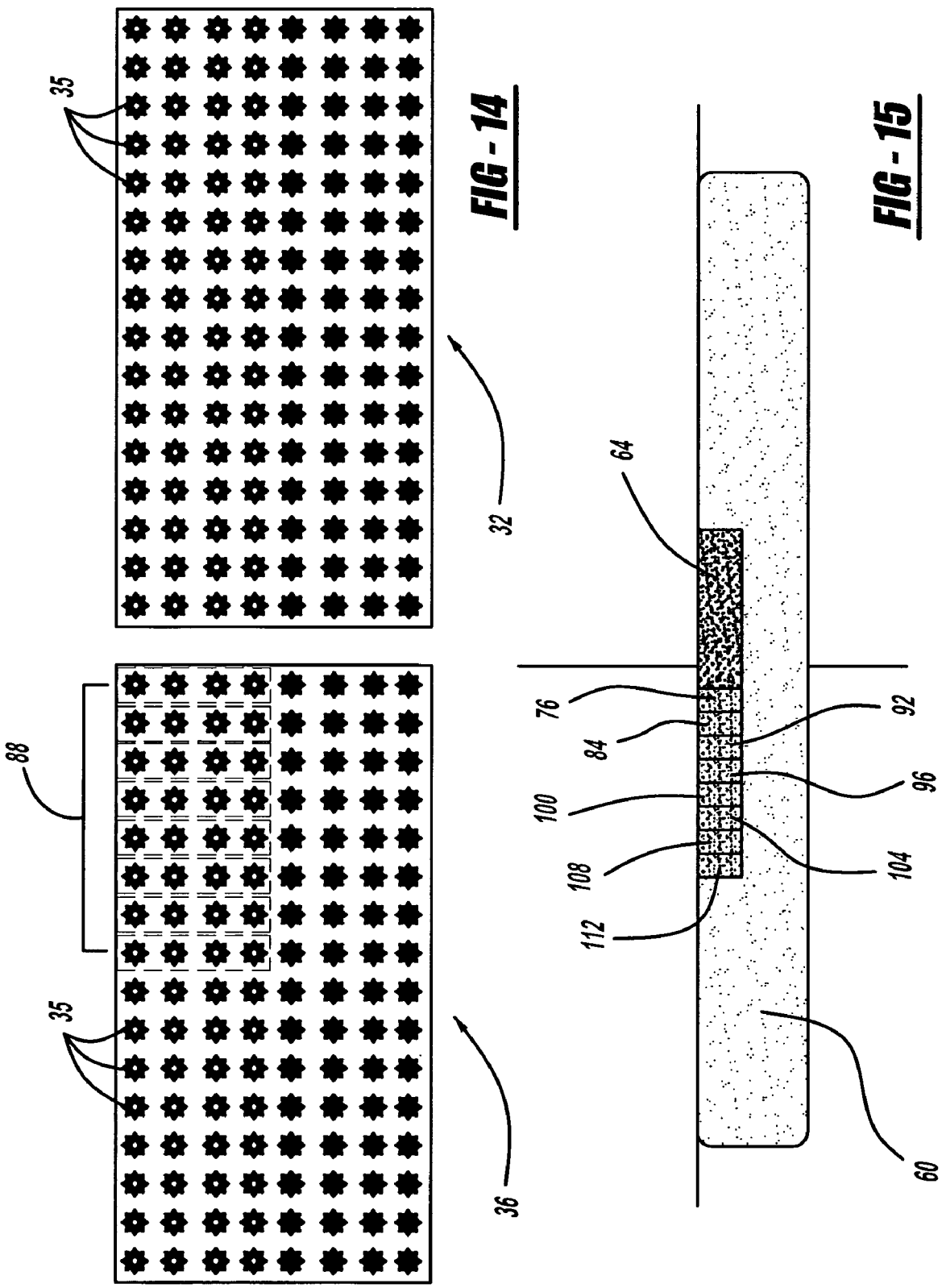

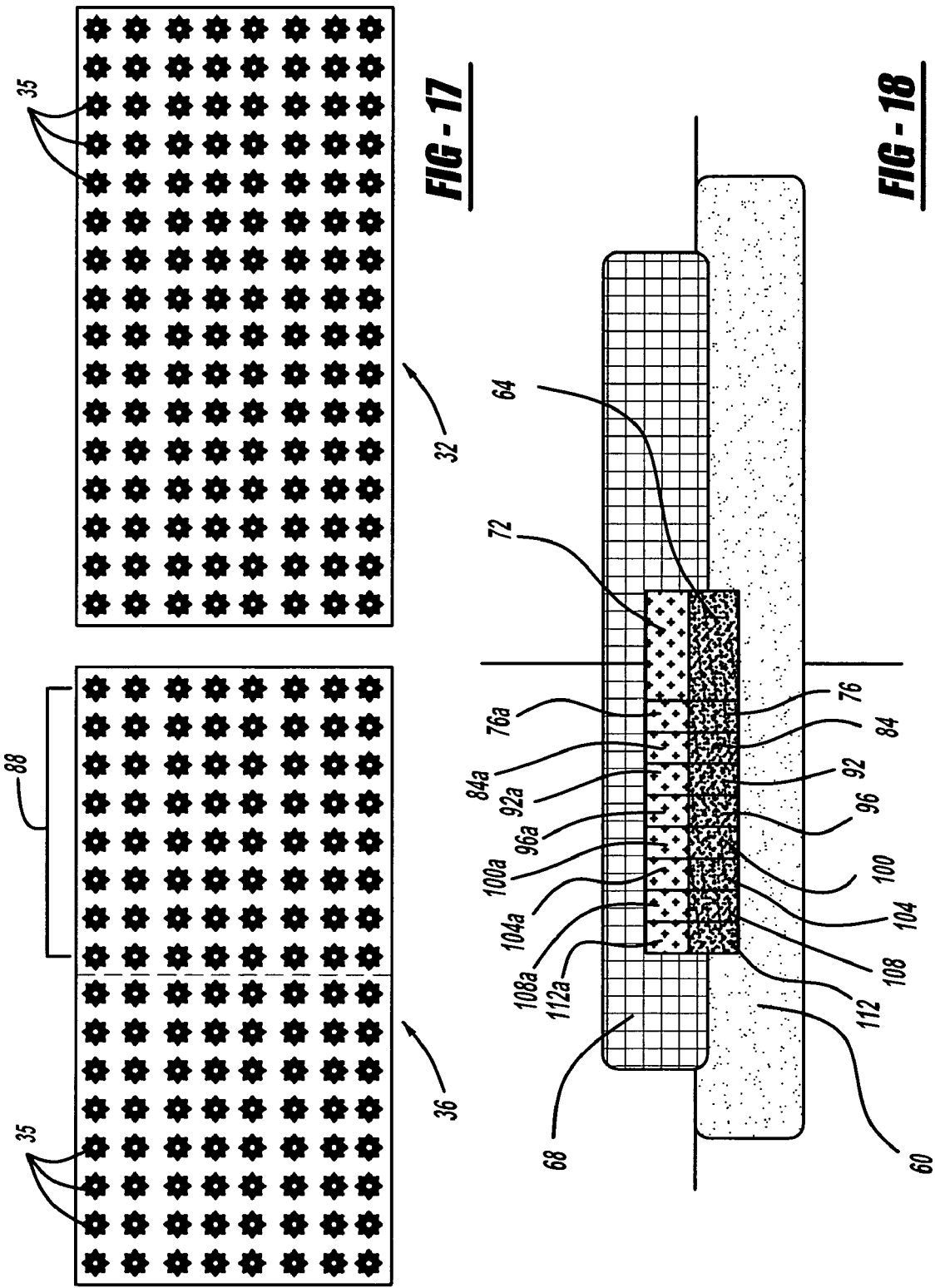

HEADLAMP WITH BEAM PATTERNS FORMED FROM SEMICONDUCTOR LIGHT SOURCES

CROSS-REFERENCE TO RELATED APPLICATIONS

This application is a continuation in-part of U.S. patent application Ser. No. 11/827,283, filed Jul. 11, 2007 now U.S. Pat. No. 7,563,009, which is a continuation of U.S. patent application Ser. No. 11/111,534 filed on Apr. 21, 2005 now U.S. Pat. No. 7,258,474.

FIELD OF THE INVENTION

The present invention generally relates to vehicular headlamps and more specifically to vehicular headlamps whose desired beam patterns are formed from light emitted by semiconductor light sources.

BACKGROUND OF THE INVENTION

A design consideration of vehicular headlamp systems concerns maximum and minimum illumination levels and produced beam patterns. In addition to this concern, aesthetic and physical design factors also play a role in the design of headlamps. Conventional incandescent and gas discharge headlamp systems have required a relatively large volume for their components, limiting the ability to design and implement more compact headlamp systems. Accordingly, it has been suggested to employ semiconductor light sources in headlamp systems as light sources.

While recent advances in the manufacture and/or design of semiconductor light sources have resulted in light sources, such as white light emitting diodes (LEDs), achieving relatively high light output levels, multiple semiconductor light sources must still be employed in a headlamp system to obtain the required levels of light output for a headlamp. Further, semiconductor sources introduce new design challenges to headlamp systems. For example, semiconductor light sources act much more like ideal point sources of light than incandescent and/or gas discharge bulbs and thus conventional headlamp optical designs may not be compatible with semiconductor light sources. In addition, issues such as the need to provide the necessary cooling of semiconductor light sources further complicate the design of headlamp systems employing semiconductor light sources.

Another long felt need in the area of vehicular headlamps is the ability to illuminate the area of the road where the vehicle is going to travel, rather than (or in addition to) the area of the road in front of the vehicle. Previous attempts have been made to provide steerable headlamps to address this issue and most of these prior art systems have included mechanical means to physically turn the headlamp, or a portion of the optics (such as a reflector and/or lens) in the headlamp, with the front wheels of the vehicle to direct the illumination from the headlamp in the desired direction. A variety of techniques have been attempted for the control of steerable headlamps, ranging from mechanical linkages with the steering mechanism of the vehicle to microprocessor controlled servo-motor driven systems.

However, such systems suffer from disadvantages in that the control mechanisms to turn the headlamp can be quite complex, expensive and/or fragile. Other prior art systems have included an additional light source in each headlamp, the left headlamp having an additional light source to illuminate the area to the left of the car and the right headlamp having an additional light source to illuminate the area to the right of the car and these additional light sources are turned on or off, appropriately, as the front wheels of the vehicle are turned. These systems also suffer from disadvantages as the area illuminated by the additional light sources is fixed and does not change with the vehicle speed or turn angle and thus the resulting beam pattern may not provide the desired illumination.

Accordingly, there exists a need for new and improved vehicular headlamp systems whose desired beam patterns are formed from light emitted by semiconductor light sources.

SUMMARY OF THE INVENTION

It is an object of the present invention to provide a novel semiconductor headlamp system that obviates or mitigates at least one disadvantage of the prior art.

The present invention is headlamp system for a vehicle including at least one first light source, at least one second light source, and a first lens system having at least one lens operably associated with the at least one first light source to provide a spread portion of a desired beam pattern. The present invention also includes second lens system having at least one lens operably associated with the at least one second light source to provide a hot spot portion of the desired beam pattern.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Preferred embodiments of the present invention will now be described, by way of example only, with reference to the attached Figures, wherein:

FIG. 3 shows two arrays of semiconductor light sources with some sources on one array illuminated to provide the spread light of a low beam pattern and some sources on the other array being illuminated to provide a hot spot of the low beam pattern, in accordance with the present invention;

FIG. 4 shows a schematic representation of the low beam pattern of FIG. 3, in accordance with the present invention;

FIG. 5 shows the two arrays of FIG. 3 with all of the sources on one array illuminated to provide spread light of a high beam pattern and some sources on the other array being illuminated to provide the hot spots of the high beam pattern, in accordance with the present invention;

FIG. 6 shows a schematic representation of the high beam pattern of FIG. 5, in accordance with the present invention;

FIG. 8 shows the two arrays of FIG. 3 wherein additional semiconductor light elements have been illuminated on one array to provide a low beam steering hot spot, in accordance with the present invention;

FIG. 9 shows a schematic representation of the low beam pattern with the low beam steering hot spot produced from the arrays of FIG. 8, in accordance with the present invention;

FIG. 11 shows the two arrays of FIG. 8 wherein an additional set of semiconductor light elements have been illuminated on one array to provide a second low beam steering hot spot, in accordance with the present invention;

FIG. 12 shows a schematic representation of the low beam pattern with the two low beam steering hot spots produced from the arrays of FIG. 11, in accordance with the present invention;

FIG. 14 shows the two arrays of FIG. 11 wherein eight sets of additional semiconductor light elements have been illuminated on one array to provide a eight low beam steering hot spots, in accordance with the present invention;

FIG. 15 shows a schematic representation of the low beam pattern with the eight low beam steering hot spots produced from the arrays of FIG. 14, in accordance with the present invention;

FIG. 17 shows the two arrays of FIG. 14 producing a high beam pattern and wherein eight additional sets of semiconductor light elements have been illuminated on one array to also provide a eight high beam steering hot spots, in accordance with the present invention;

FIG. 18 shows a schematic representation of the high beam pattern with the eight high beam steering hot spots and the eight low beam steering hot spots produced from the arrays of FIG. 17, in accordance with the present invention;

DETAILED DESCRIPTION OF THE INVENTION

Figure 1:
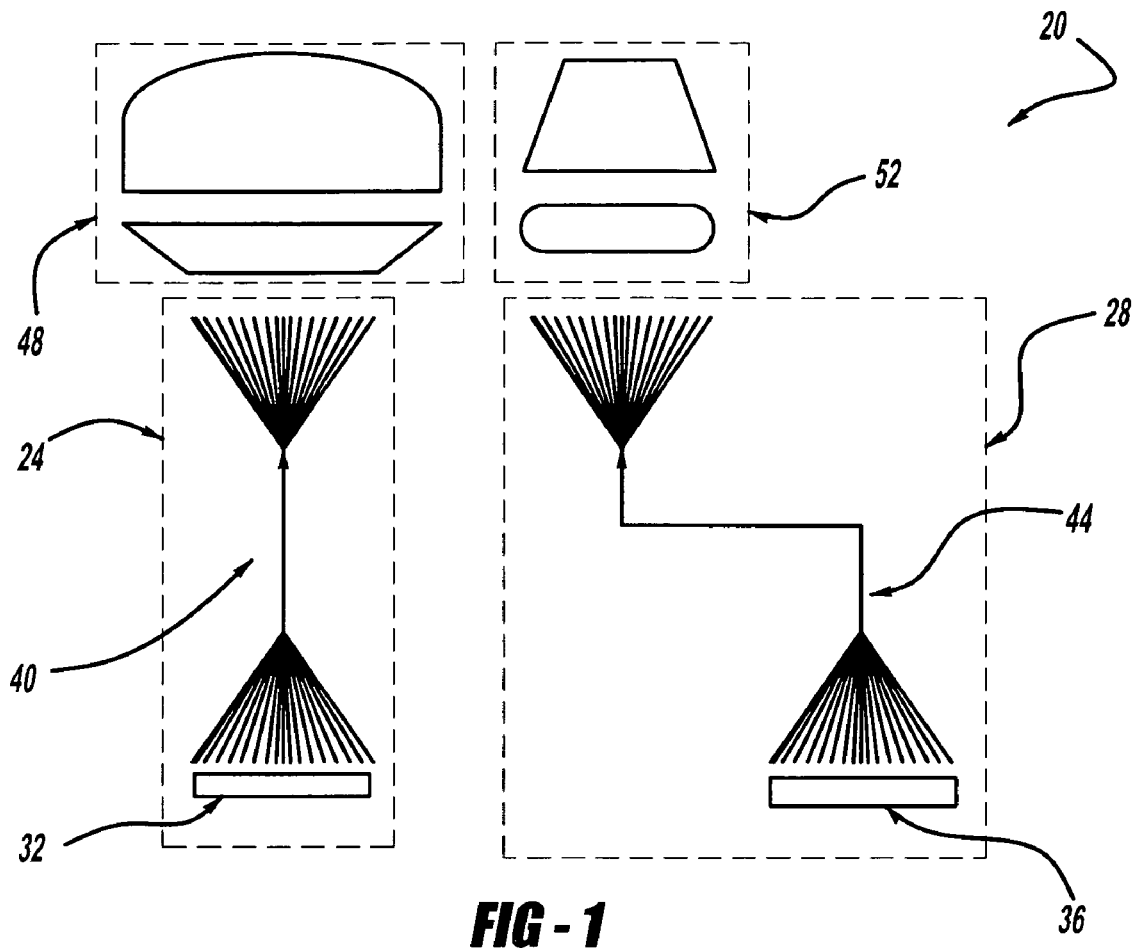
FIG. 1 shows a schematic representation of a headlamp system, in accordance with the present invention.

Referring to the Figures generally, and specifically to FIG. 1, a headlamp system in accordance with the present invention is indicated generally at 20. System 20 includes two light engines 24, 28, respectively, each of which includes a light source array 32, 36, respectively, of semiconductor light sources 35.

Figure 2:
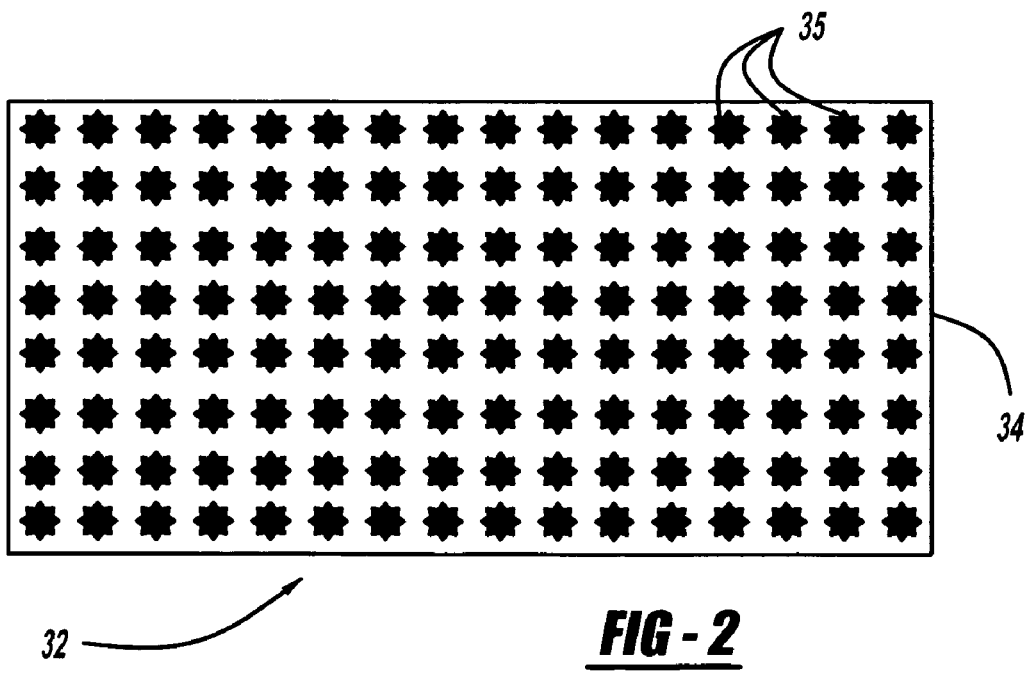
FIG. 2 shows a schematic representation of an array of semiconductor light sources, in accordance with the present invention.

Referring to FIG. 2, source array 32 includes a substrate 34 on which a plurality of semiconductor light sources 35 are mounted. Source array 36 can be similarly constructed. While source arrays 32, 36, respectively, are shown in the Figures as having separate substrates 34, both source arrays can share a common substrate 34, if desired, or each source array can be a composite of two or more substrates 34.

Semiconductor light sources 35 can be any suitable semiconductor light source, such as LED devices that emit white light, and/or the like. Substrate 34 can be any suitable substrate capable of supporting semiconductor light sources 35, the necessary electrical conductors to supply power to semiconductor light sources 35, and heat removal means to assist in moving waste heat created by operation of semiconductor light sources 35 away from those semiconductor light sources 35.

In a present embodiment of system 20, substrate 34 can be a multilayer printed circuit board (PCB) to which semiconductor light sources 35 are surface mounted. The PCB includes at least one heat transfer layer, such as a layer of copper or other material with good thermal transfer characteristics, which acts as a heat removal means to which a heat sink can be attached to remove waste heat produced by the semiconductor light sources 35. The PCB includes the necessary conductor traces to provide power to semiconductor light sources 35. As will be apparent those of skill in the art, a heat pipe, wick or other suitable means can be employed instead of, or in addition to, the PCB heat transfer layer to remove waste heat produced by the operation of semiconductor light sources 35.

Each semiconductor light source 35 can be individually addressable and thus can be activated or deactivated independently of the other semiconductor light sources 35 and can be operated at a variety of output levels. However, it is contemplated that, if desired, semiconductor light sources 35 and the power traces can be arranged such that light sources 35 can be activated or deactivated and their output levels selected, in groups comprising two or more light sources 35.

Referring again to FIG. 1, light engines 24, 28, respectively, further include transfer devices 40, 44, respectively, which transfer the light emitted by the semiconductor light sources 35 on source arrays 32, 36, respectively, to desired light output locations in headlamp system 20. In a present embodiment of system 20, transfer devices 40, 44, respectively, comprise bundles of light pipes, each light pipe of a bundle having a receiving end (e.g., located adjacent a respective semiconductor light source 35 in a source array 32 or 36) and an emitting end (e.g., at the location wherein it is desired to have the emitted light). The light pipes of transfer devices 40, 44 can be constructed in a variety of manners and can be fiber optic cables, light guides manufactured from polycarbonate or transparent silicone rubber or moldable acrylic resins, such as Acrymid™ 815, sold by CYRO Industries of Rockaway, N.J. or any other suitable method of transferring light from a light source to a desired location.

The light pipes can also be constructed from an inner optical glass member clad in a second glass which has a lower index of refraction than the inner optical glass to enhance internal reflection of the light from semiconductor sources 35 through the light pipe. In a specific embodiment, the inner optical glass has an index of refraction of 1.81 while the cladding glass has an index of refraction of 1.48 which results in a numerical aperture for the light pipe of 1.0. As will be apparent to those of skill in the art, other two-glass combinations can be used to fabricate the light pipes or combinations of relatively high index glass and other, relatively lower index, cladding materials can also be used to fabricate the light pipes.

The light pipes of transfer devices 40, 44, respectively, can be arranged in known manners to capture a relatively large amount, and preferably substantially all, of the light produced by the semiconductor light sources 35 of source arrays 32, 36, respectively. By way of a non-limiting example, the ends of the light pipes adjacent each semiconductor light source 35 are optically flat surfaces to enhance the capture of emitted light and appropriate reflectors (not shown) can be mounted about each semiconductor light source 35 on substrate 34 to direct the emitted light from semiconductor light sources 35 into the respective light pipes of transfer devices 40, 44, respectively.

By way of a non-limiting example, the emitting end of transfer device 40 can be located adjacent a lens system 48 and the emitting end of transfer device 44 can be located adjacent a lens system 52. Lens systems 48, 52, respectively, can be single lens systems or multi-lens systems. In a present embodiment, each of lens system 48, 52, respectively, can be a two lens system, as is described below.

It is further contemplated that the emitting ends of the light pipes of one or both transfer devices 40, 44 can be vertically and/or horizontally spaced, or staggered, with respect to their respective lens systems 48 and 52 to produce desired features in a beam pattern, such as lighting to illuminate roadside signs, etc.

Further, as should now be apparent to those of skill in the art, by employing transfer devices 40 and 44, the location and arrangement of the light emitted from the emitting ends of transfer devices 40 and 44 can be established independent of the location, spacing and arrangement of semiconductor light sources 35 on source arrays 32 and 36. Transfer devices 40, 44, respectively, also allow source arrays 32, 36, respectively, to be located distal from lens systems 48, 52, respectively, thus allowing any required cooling mechanisms, such as relatively large heat exchange members, cooling fans, and/or the like to be located in aesthetically acceptable locations, rather than proximal lens systems 48, 52, respectively.

In this manner, vehicle designers have more flexibility in their aesthetic and functional designs of vehicles as only lens systems 48, 52, respectively, and the emitter ends of transfer devices 40, 44, respectively, need be located in one of the conventional locations for a headlamp system and the remainder of the headlamp system 20 can be located elsewhere.

Headlamp beam patterns typically comprise spread light, which illuminates a relatively large portion of the beam pattern at relatively even illumination levels, and hot spots which are relatively small areas of increased illumination levels typically superimposed on areas of the spread light. The headlamp system, especially with respect to beam patterns, should be carefully designed and configured to ensure that both the area and illumination levels of the spread illumination and the area and the illumination levels of the hot spots are within acceptable regulatory limits.

In headlamp system 20, light engine 24 and lens system 48 are preferably employed to provide the spread light, while light engine 28 and lens system 52 are preferably employed to provide the hot spot light and dynamic light, as described below. Accordingly, lens system 48 can be designed to direct the light from the emitter end of transfer device 40 to produce the desired spread light of the beam pattern from headlamp system 20.

Referring to FIG. 3, source arrays 32, 36, respectively, are shown wherein semiconductor light sources 35 that are illuminated are indicated with symbols with hollow centers while the non-illuminated semiconductor light sources 35 are indicated with solid symbols. As shown, about half of the semiconductor light sources 35 on light source array 32 are illuminated and the light produced by these semiconductor light sources 35 can be transferred, by transfer device 40, to lens system 48 to create the spread component 60 of the low beam pattern illustrated in FIG. 4 against reference horizontal and vertical axes.

Lens system 48 includes a first lens which serves to vertically limit the beam pattern produced by lens system 48 and also includes a second lens which horizontally spreads the beam pattern produced by lens system 48.

As is also shown, about one quarter of the of the semiconductor light sources 35 on light source array 36 are illuminated and the light produced by these semiconductor light sources 35 can be transferred, by transfer device 44, to lens system 52 to create the hot spot component 64, which typically may be about three degrees high and six degrees wide, of the low beam pattern illustrated in FIG. 4. While lens system 52 could employ a single lens to provide the desired hot spot, such a single lens could not easily produce the steerable light, discussed below, and thus lens system 52 also employs two lenses. The first lens of lens system 52 can be located relatively close to the emitter ends of transfer device 44 and projects the light from transfer device 44 into an image of about six degrees in the horizontal direction without substantially affecting the vertical characteristics of the projected light. The second lens of lens system 52 has a longer focal length to compress the illumination pattern output from the first lens to about three degrees in the vertical direction. Thus, as further discussed below, lens system 52 can provide the appropriate bending for the steerable light to reach fifteen degrees without compromising the shape of hotspot 64.

Referring to FIG. 5, there is shown the semiconductor light sources 35 that are illuminated on source arrays 32, 36, respectively, to produce the high beam pattern illustrated in FIG. 6. As shown, all of the semiconductor light sources 35 of source array 32 are illuminated with the additionally illuminated (with respect to those illuminated for the low beam pattern of FIG. 4) semiconductor light sources 35 producing the spread zone 68 of the high beam pattern illustrated in FIG. 6. Similarly, about another quarter of the semiconductor light sources 35 of source array 36 have been illuminated to produce high beam hot spot 72 of FIG. 6.

As should be apparent to those of skill in the art, the present invention is not limited to any particular number of semiconductor light sources 35 being provided on source arrays 32, 36, respectively, nor is the present invention limited to any particular number of semiconductor light sources being illuminated to obtain desired outputs in a produced beam pattern. Instead, the present invention can be used with any number of semiconductor light sources, determined solely by the amount of light emitted by the particular semiconductor light sources employed, the efficiency with which transfer devices 40, 44, respectively, and lens systems 48, 52, respectively, operate and the desired beam pattern and illumination levels therein. By way of a non-limiting example, in the discussion of steering hotspots which follows, four semiconductor light sources are used to create each hotspot, but it is contemplated that if a higher output semiconductor light source is employed, three or less semiconductor light sources can be employed to create such hot spots.

Figure 7:
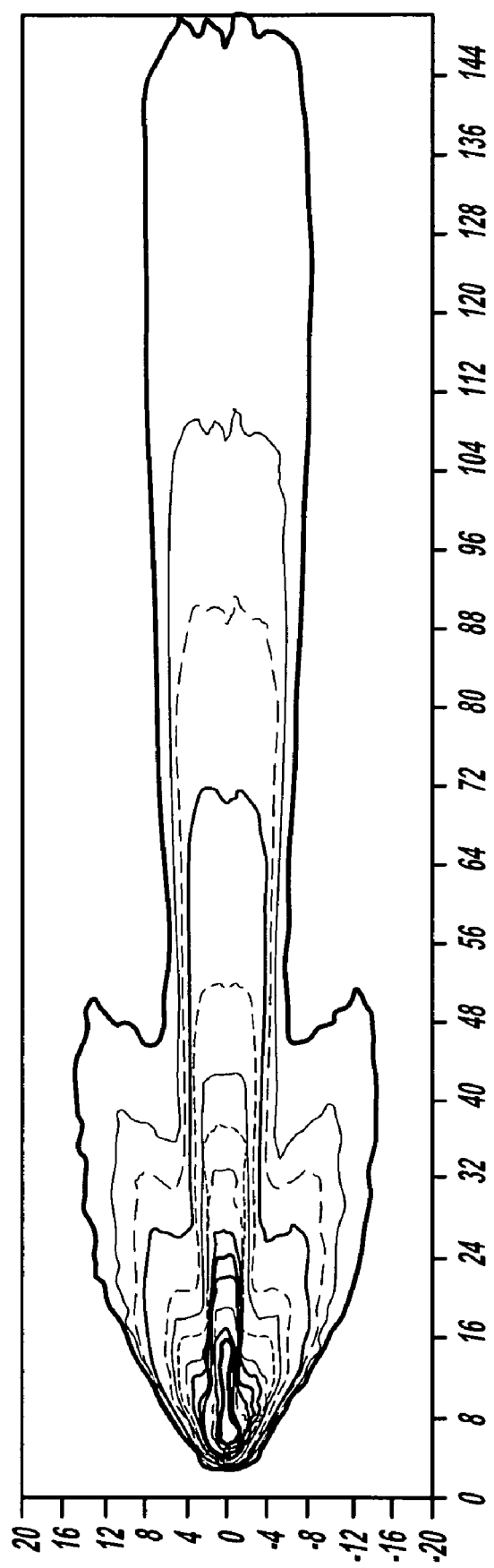
FIG. 7 shows a top view of the low beam pattern of FIG. 3 indicating the intensity of the light of the pattern, in accordance with the present invention.

Referring to FIG. 7, there is shown a schematic representation of a top view (looking down) of the low beam pattern of FIG. 4 wherein the vertical axis of the Figure indicates degrees of horizontal spread of the pattern, the horizontal axis indicates the distance of the pattern from the headlamp system 20, and the color of the pattern indicating line indicates the illumination level of the pattern, corresponding to the illustrated scale.

As discussed above, in addition to the formation of required low beam and high beam patterns, it is also desired to provide dynamic light pattern components, such as steerable light from headlamp system 20, the steerable light illuminating the area about the vehicle over which the vehicle will be traveling as it is turned from a straight path. By way of a non-limiting example, when the vehicle is being turned to the left, it is desirable that a portion of the road in front of the vehicle, to the left, be illuminated.

A controller, not shown, can be operable to illuminate or extinguish additional semiconductor light sources 35 of source array 36 to provide dynamic illumination, as discussed below. The controller can accept inputs such as, but not limited to, steering wheel position, vehicle speed, and vehicle body roll, and will illuminate or extinguish the additional semiconductor light sources as needed. The construction and operation of such a controller is within the common general knowledge of those of skill in the art and will thus not be further described herein.

Referring to FIG. 8, there are shown source arrays 32, 36, respectively, wherein a first increment of steerable light is being added to the low beam pattern shown in FIG. 4 by the controller in response to its received inputs. Specifically, four additional semiconductor light sources 72 on source array 36 have been illuminated. The illumination emitted by these four additional light sources 72 can be directed by lens system 52 to produce the added steering hot spot 76, as shown in FIG. 9, on the low beam pattern. As will be apparent to those of skill in the art, if headlamp system 20 was being operated to produce a high beam, the four semiconductor light sources below light sources 72 can also be illuminated, for a total of eight additional light sources, to provide a high beam steerable light pattern and this is further discussed below, with reference to FIGS. 17 and 18.

Figure 10:
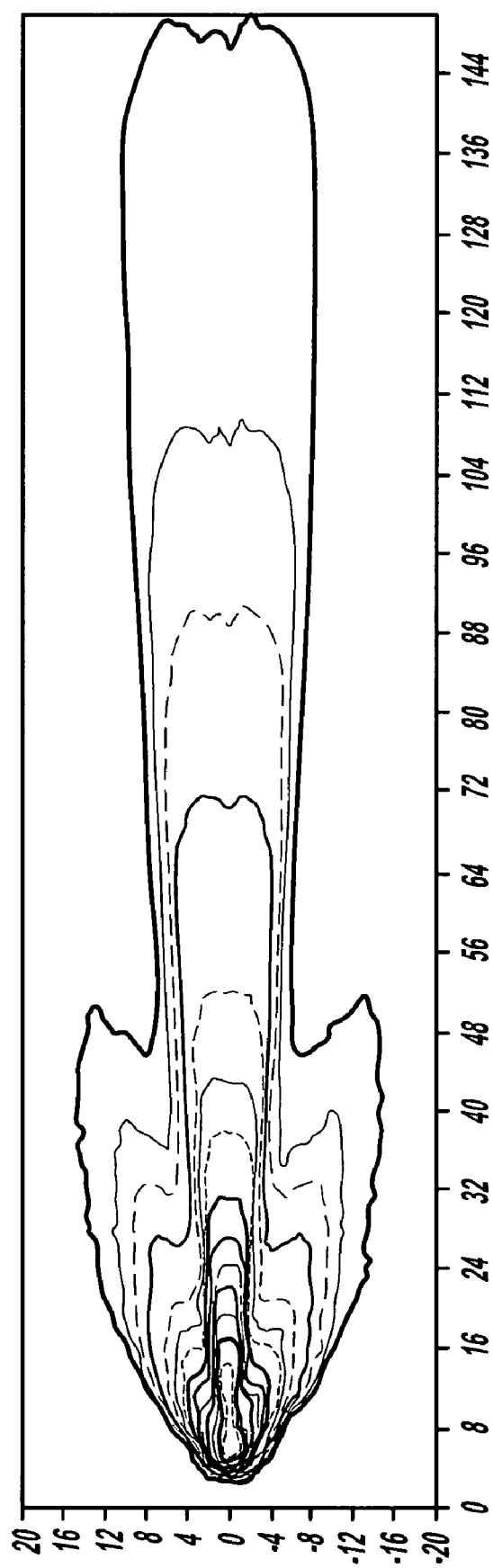
FIG. 10 shows a top view of the low beam pattern of FIG. 9 indicating the intensity of the light of the pattern with the added low beam steering hot spot, in accordance with the present invention.

Referring to FIG. 10, there is shown a schematic representation of a top view of the beam pattern of FIG. 9. As illustrated, steering hot spot 76 of FIG. 9 produces a slight widening of the beam pattern of FIG. 10 to the left (towards the top of the plot, in the illustrated orientation).

Referring to FIG. 11, there are shown source arrays 32, 36, respectively, wherein a second increment of steerable light is being added by the controller to the low beam pattern shown in FIG. 9. Specifically, four additional semiconductor light sources 80 on source array 36 have been illuminated. The illumination emitted by these four additional light sources 80 can be directed by lens system 52 to produce the second steering hot spot 84, as shown in FIG. 12, on the low beam pattern.

Figure 13:
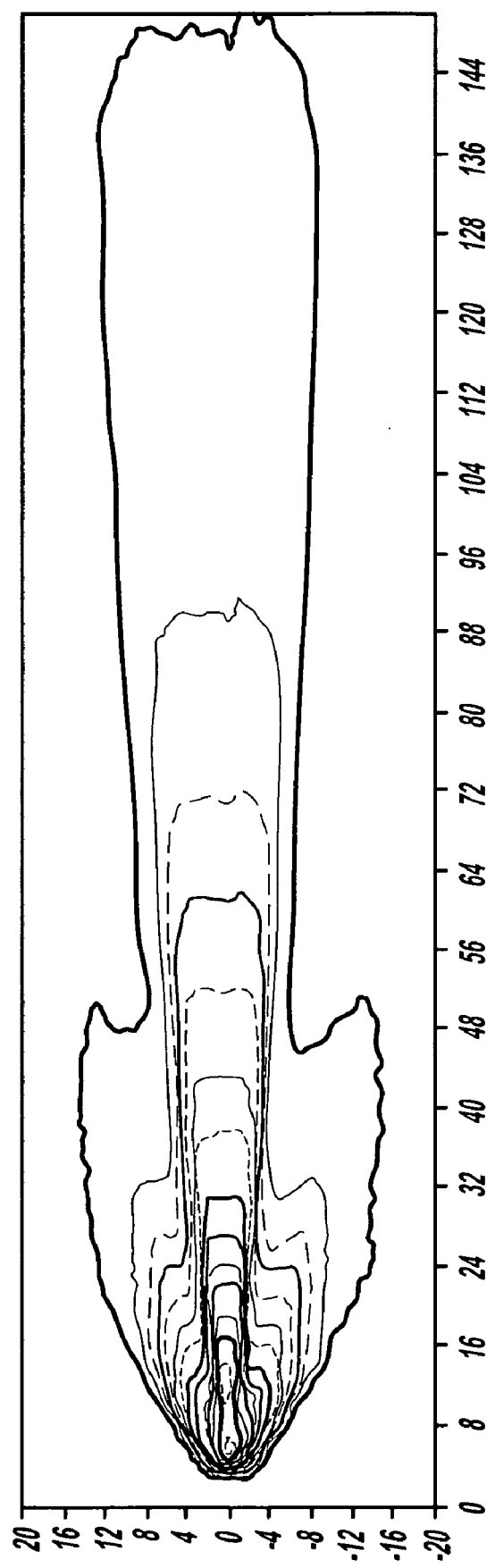
FIG. 13 shows a top view of the low beam pattern of FIG. 12 indicating the intensity of the light of the pattern with the two added steering hot spots, in accordance with the present invention.

Referring to FIG. 13, there is shown a schematic representation of a top view of the beam pattern of FIG. 12. As illustrated, the steering hot spots 76, 80, respectively, of FIG. 12 produce a larger widening of the beam pattern to the left (towards the top of the plot, in the illustrated orientation). If desired, additional increments of steerable light can be added by the controller.

Referring to FIG. 14, there are shown source arrays 32, 36, respectively, wherein a total of eight increments of steerable light 88 have been added by the controller to the low beam pattern of FIG. 12 to produce steering hot spots 76, 84, 92, 96, 100, 104, 108, 112, respectively, as shown in FIG. 15.

Figure 16:
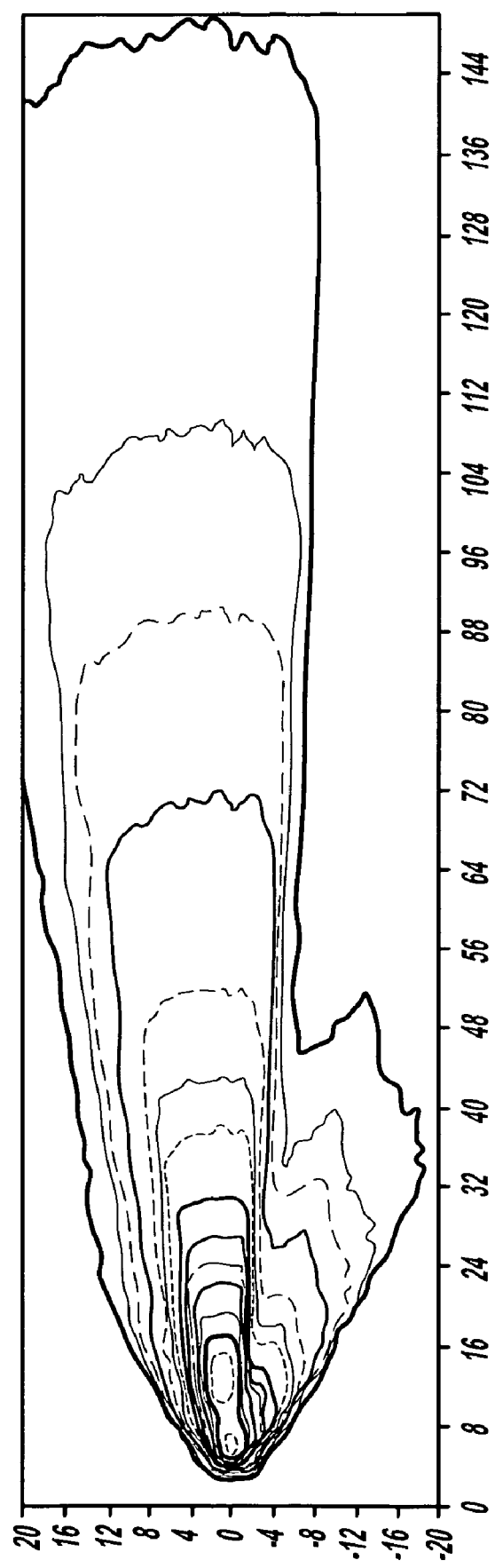
FIG. 16 shows a top view of the low beam pattern of FIG. 15 indicating the intensity of the light of the pattern with the eight steering hot spots, in accordance with the present invention.

Referring to FIG. 16, there is shown a schematic representation of a top view of the beam pattern of FIG. 15. As illustrated, steering hot spots 76, 84, 92, 96, 100, 104, 108, 112, respectively, produce a relatively large widening of the beam pattern to the left (towards the top of the plot, in the illustrated orientation).

While FIG. 14 shows the eight increments 88 having been added all at once, this has been shown for conciseness of description and, as will be apparent to those of skill in the art, the controller can add each increment of steerable light, one by one, or in groups of two or more increments, depending upon the operating conditions of the vehicle, as determined from the inputs to the controller.

As will be apparent to those of skill in the art, when headlamp system 20 is producing a high beam pattern, high beam steering hot spots 76a, 84a, 92a, 96a, 100a, 104a, 108a, 112a, respectively, can also be provided when needed, by illuminating additional semiconductor light sources 35 on source engine 36, as shown in FIGS. 17 and 18.

While FIGS. 8 through 18 have shown a headlamp for the left hand side of a vehicle, it should be apparent to those of skill in the art that the present invention is not so limited and headlamp system 20 can be employed as either the right or left hand side headlamp. In the case of a headlamp system 20 being used in a right hand side headlamp, the steerable hot spots will be projected onto the right hand side of the low beam and high beam patterns.

By illuminating or extinguishing additional semiconductor light sources 35 on source array 36 and by lens system 52 directing the additional light produced to create additional steering hot spots for increased illumination directed left (or right, for the right hand headlamp), headlamp system 20 provides steerable light without requiring the mechanical movement of light sources or optical system components.

Further, the controller can operate the additional semiconductor light sources 35 at different output levels to achieve desired illumination patterns of the steerable light. For example, the controller can illuminate the semiconductor light sources 35 which produce steering hot spots 108, 112, respectively, at higher output levels than the semiconductor light sources 35 which produce steering hot spots 100, 104, respectively.

Also, while in the embodiment discussed above there can be a direct correspondence between the location of each particular semiconductor light source 35 on source array 32, 36, respectively, and where the light the semiconductor light source 35 emits appears in the produced beam pattern, the present invention is not so limited. Specifically, it is implied that the rightmost increment of four semiconductor light sources 35 in increment 88 of FIG. 14 are producing hot spot 112 while the leftmost increment of four semiconductor light sources 35 in increment 88 are producing hot spot 76 (as shown in FIG. 8). However, such direct correspondence only occurs if the receiving and emitting ends of light pipes in transfer devices 40, 44, respectively, are arranged with such a direct correspondence. As will be apparent to those of skill in the art, such a direct correspondence is not required and, in fact, may be undesired in some circumstances. By way of a non-limiting example, it may be desired that semiconductor light sources 35 on source arrays 32, 36, respectively, which are normally illuminated at the same time as other semiconductor light sources 35 on the respective source array 32 or 36 not be placed adjacent one another on substrate 32 to provide for improved removal of waste heat. In such a case, provided that the receiving and emitting ends of light pipes of the transfer devices 40, 44, respectively, are correctly arranged, the desired output beam pattern can still be obtained.

Further, while in FIGS. 8 through 18 the emitter ends of transfer devices 40, 44 have been shown located in close proximity to one another, as mentioned above this is not required and it is contemplated that in many circumstances at least some of the emitter ends of a transfer device 40 or 44 can be spaced from one another, with respect to their respective lens system 48 or 52, to achieve a desired beam pattern.

As will now be apparent, the present invention provides a headlamp system that forms desired beam patterns from light supplied by semiconductor light sources. The system includes a source array of semiconductor light sources and a lens system to produce the spread components of the desired beam patterns and a source array of semiconductor light sources and a lens system to produce the hot spot components of the desired beam patterns. Light from the semiconductor light sources of each source array can be transferred to the respective lens system by a transfer device comprising a series of light pipes which capture light emitted by the semiconductor light sources and emit the captured light adjacent the respective lens systems. One or both source arrays can include additional semiconductor light sources that can be selectively illuminated or extinguished to provide dynamic beam pattern components, such as steering hot spots in the beam pattern to illuminate areas adjacent the vehicle over which the vehicle will be turned.

By employing transfer devices between the source arrays and the lens systems, the source arrays and lens systems can be spaced from each other, allowing headlamp system 20 to be installed in volumes of smaller size, or of shapes which would not be possible if the lens systems had to directly receive the light emitted by the source arrays.

Figure 19:
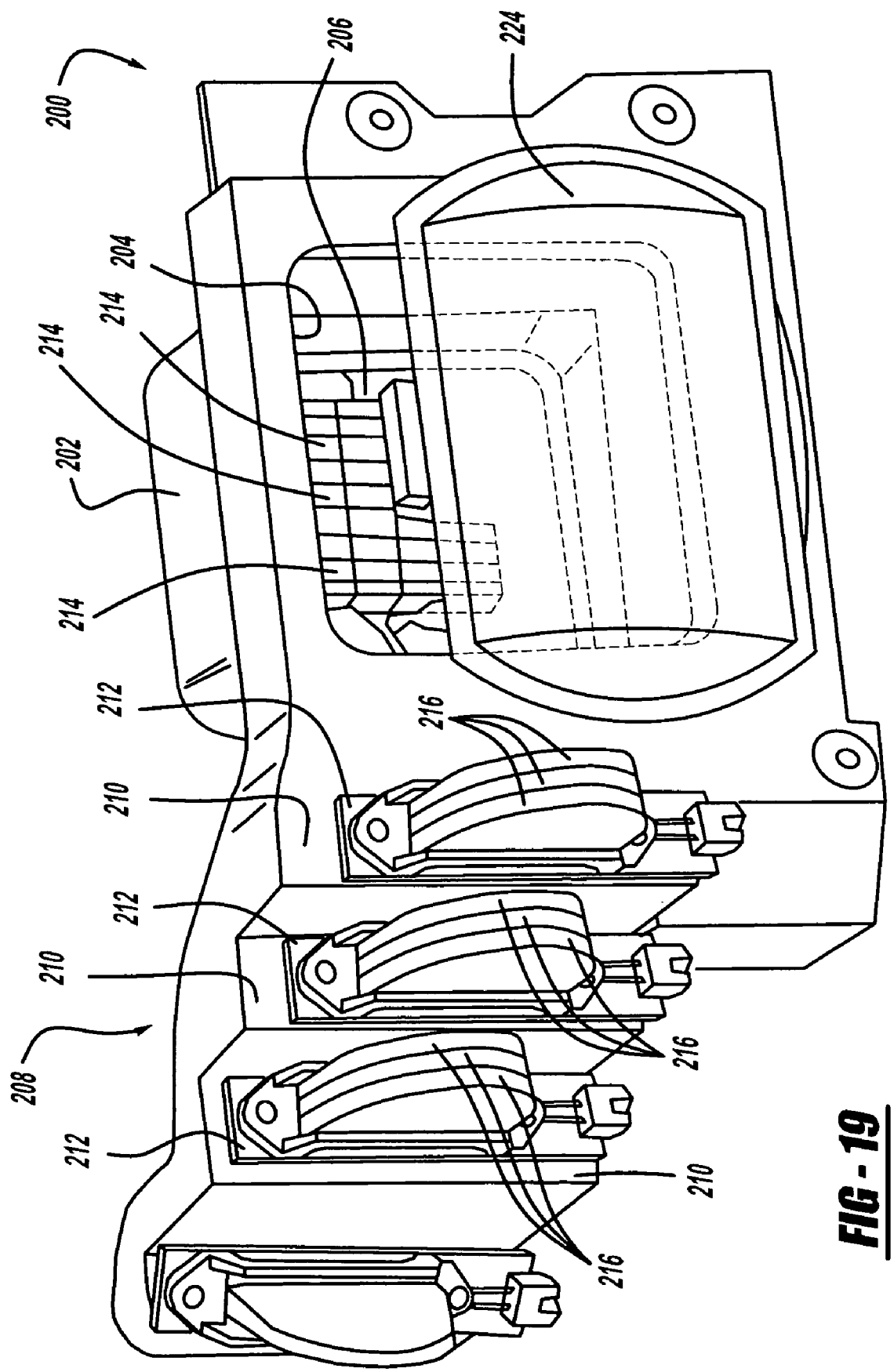
FIG. 19 is a perspective view of a headlamp system with the lens of the second lens system displaced from the frame, according to a second embodiment of the present invention.

An alternate embodiment of a headlamp system according to the present invention incorporating a single lens for providing the spread component of the desired beam pattern, and a single lens for providing the hot spot component of the desired beam pattern is shown in FIG. 19 generally at 200.

The headlamp system 200 has a frame 202 which includes a cavity 204 for receiving a substrate 206. The frame 202 also has a stepped portion, generally shown at 208, having a plurality of steps 210. Mounted on each of the plurality of steps is a substrate 212. Mounted on each substrate 212 are a plurality of light emitting diodes (LEDs) 214, and all of the plurality of LEDs 214 together form the first array of semiconductor light sources in this embodiment. Preferably, there are three substrates 212, with three LEDs 214 mounted on each substrate 212.

Figure 20:
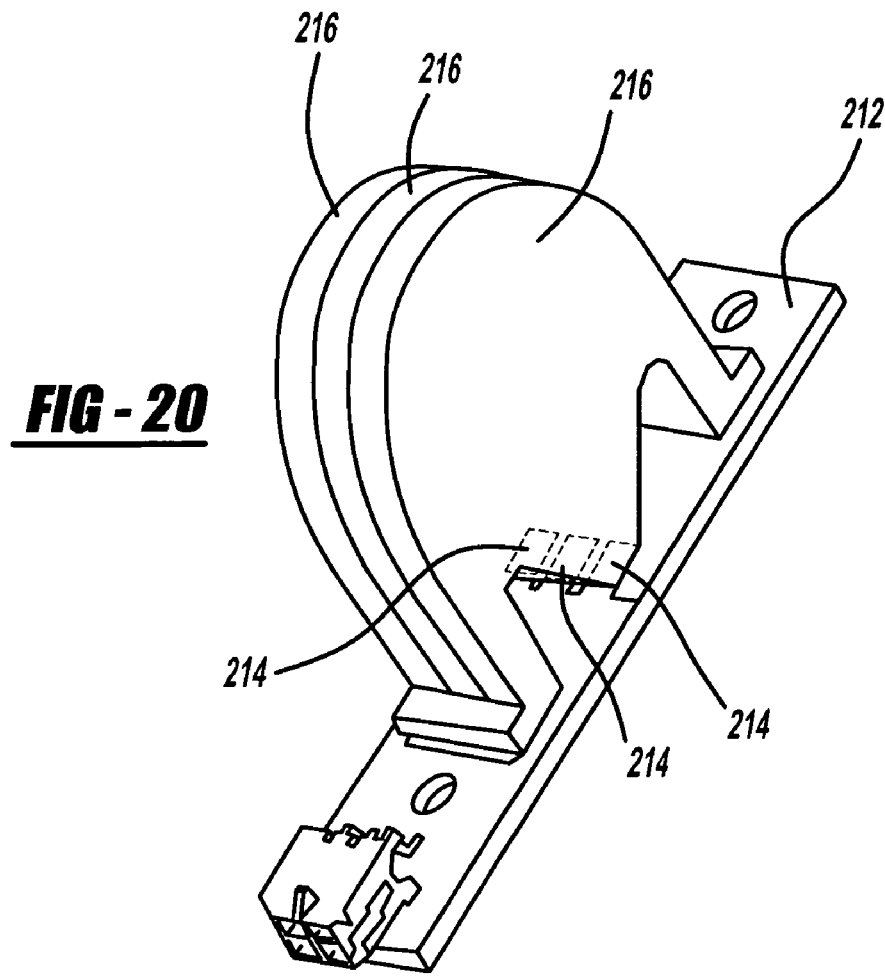
FIG. 20 is an enlarged view of a group of light emitting diodes and corresponding D-optics in a first lens system, using for producing a portion of a spread beam pattern, according to a second embodiment of the present invention.

Also mounted on each of the substrates 212 are a plurality of lenses 216, which together form a first lens system that is used along with the LEDs 214 to form a spread component of a desired beam pattern. Each one of the plurality of lenses 216 is used with one LED 214, best seen in FIG. 20. Therefore, the light emitted from one LED 214 passes through one corresponding lens 216. In this embodiment, the first lens system has a total of nine lenses 216, which are divided into three groups, each having three lenses 216. One of these groups is best seen in FIG. 20; here, light from the two outside lenses 216 provides the low-intensity portion of the spread beam component, and the middle lens 216 provides the high-intensity portion of the spread beam component. It should be noted that all three groups operate in the same manner, with light from the two outside lenses 216 of each group providing the low-intensity portion of the spread beam pattern, and light from the middle lens 216 of each group providing the high-intensity portion of the spread beam component.

Figure 21:
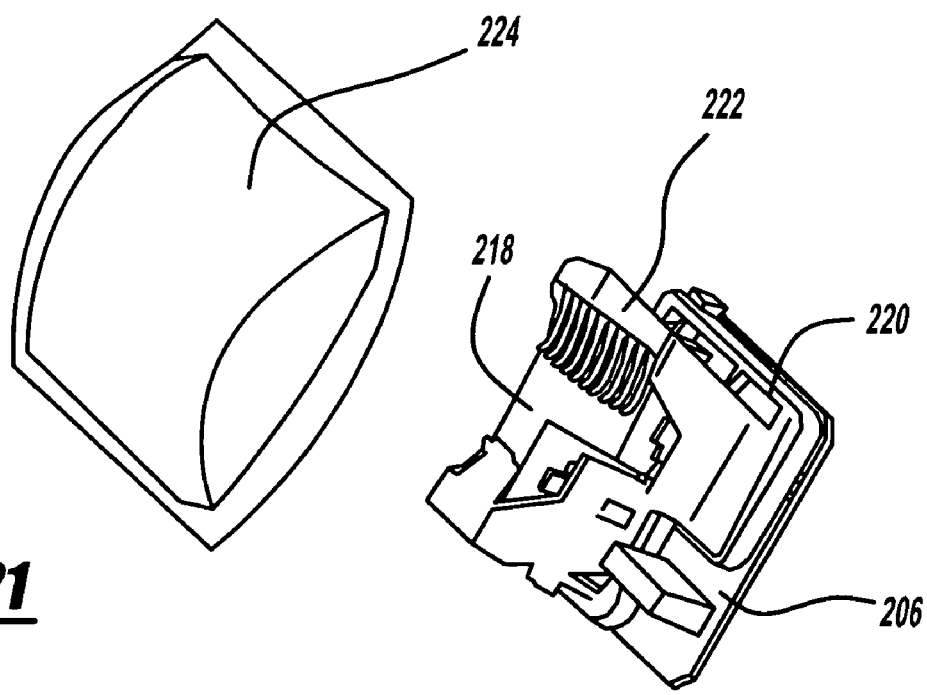
FIG. 21 is a perspective view of a second lens system and light emitting diodes mounted on a substrate with the frame removed, according to a second embodiment of the present invention.
Figure 22:
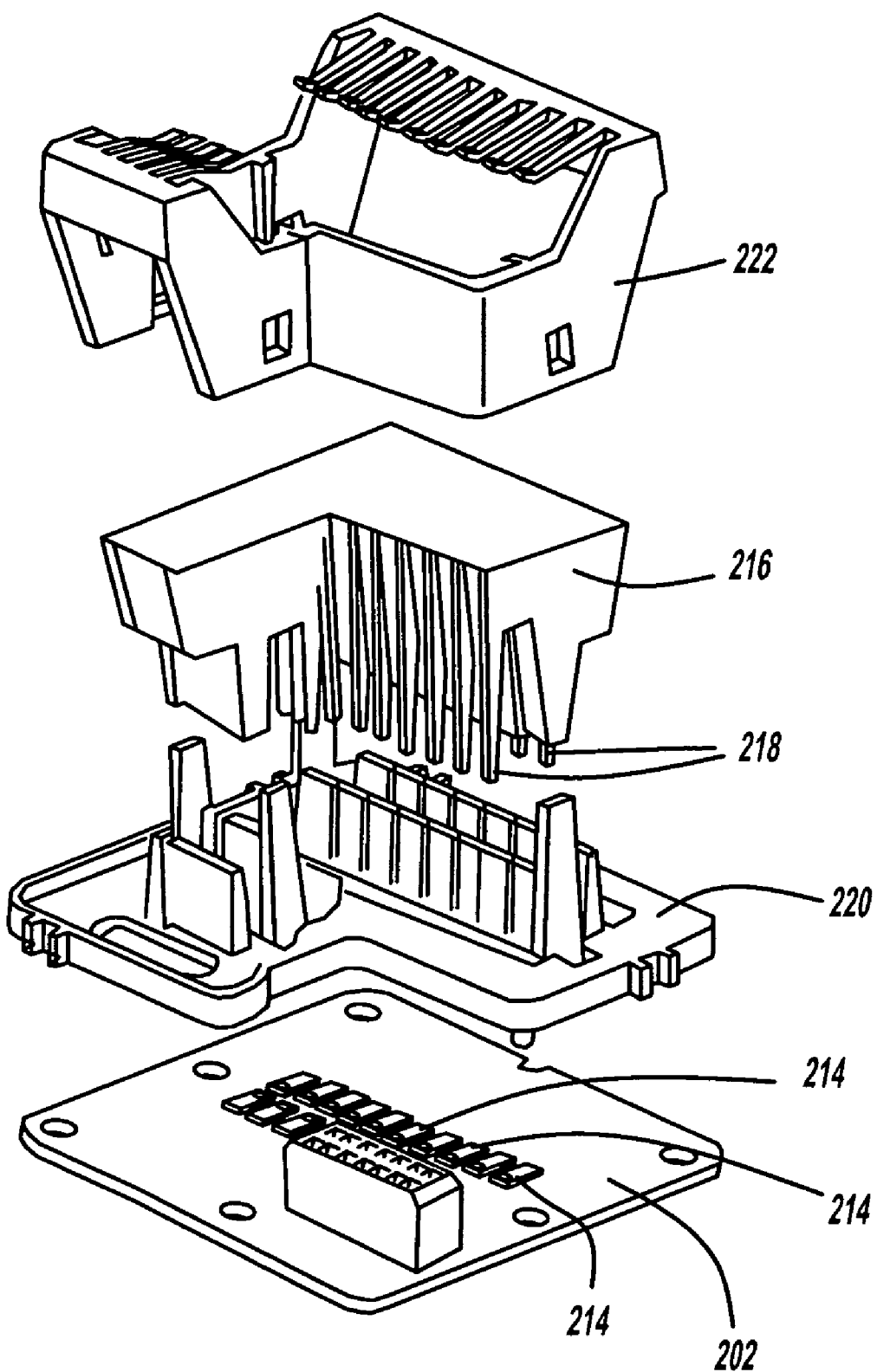
FIG. 22 is an exploded view of a plurality of light emitting diodes mounted on a substrate, and a group of corresponding light pipes, according to a second embodiment of the present invention.

Referring now to FIGS. 21 and 22, a second array of semiconductor light sources, which in this embodiment is a plurality of LEDs 214 mounted on the substrate 206. Each of the plurality of LEDs 214 emits light received into at least one light transfer device, which in this embodiment is a plurality of light pipes 218. More particularly, there are fifteen LEDs 214 mounted on the substrate 206, and fifteen light pipes 218, with each of the light pipes 218 receiving light from a corresponding LED 214. Connected to the substrate 206 is a holder, or pipe holder 220. The piper holder 220, along with a retainer, or pipe retainer 222, connects to the pipe holder 220, and maintains the position of the light pipes 218 relative to the LEDs 214 on the substrate 206. The LEDs 214 on the substrate 206 can be selectively illuminated to produce various desired hot spot components of a desired beam pattern. Additionally, the LEDs 214 on the substrate 206 can also be selectively illuminated to produce a high-intensity portion of the hot spot component, or a low-intensity portion of a hotspot component of the desired beam pattern.

After the light emitted from the LEDs 214 on the substrate 206 passes through the light pipes 218, the light will then pass through a second lens system, which in this embodiment is a single lens 224 having a focal length of one-hundred millimeters. The lens 224 helps to produce the hot spot component of the desired beam pattern, and to position the hot spot component at a location within ±2° of the horizontal center and vertical center of the desired beam pattern.

The above-described embodiments of the invention are intended to be examples of the present invention and alterations and modifications may be effected thereto, by those of skill in the art, without departing from the scope of the invention which is defined solely by the claims appended hereto.

We claim:

1. A headlamp system for a vehicle, comprising:
   at least one first light source;
   at least one second light source;
   a first lens system having at least one lens operably associated with said at least one first light source to provide a spread portion of a desired beam pattern;
   a second lens system having at least one lens operably associated with said at least one second light source to provide a hot spot portion of said desired beam pattern; and
   wherein said at least one second light source further comprises a second plurality of light sources, wherein a portion of said second plurality of light sources produces a low-intensity portion of said hot spot component of said desired beam pattern, and a portion of said second plurality of light sources produces a high-intensity portion of said hot spot component of said desired beam pattern.

2. The headlamp system for a vehicle of claim 1, further comprising at least one transfer device for transferring light emitted from said at least one second light source to said second lens system.

3. The headlamp system for a vehicle of claim 2, further comprising:
   a holder for holding said at least one transfer device; and
   a retainer for positioning said at least one transfer device between said holder and said retainer, said retainer selectively connected to said holder.

4. The headlamp system for a vehicle of claim 2, wherein said at least one transfer device comprises at least one light pipe which corresponds to said at least one second light source, and wherein said at least one light pipe has a first end adjacent said at least one second light source, to capture light emitted from at least one second light source, and a second end to emit the captured light onto said second lens system.

5. The headlamp system for a vehicle of claim 1, said first lens system further comprising a plurality of lenses, said at least one first light source further comprising a first plurality of light sources such that at least one of said plurality of lenses is operably associated with one of said first plurality of light sources to form a high-intensity portion of said spread beam pattern, and at least one of said at least two lenses, each of which is operably associated one of said first plurality of light sources, forms a low-intensity portion of said spread beam pattern.

6. The headlamp system for a vehicle of claim 5, said first lens system further comprising nine lenses, each of which being operable with one light source from said first plurality of light sources, said nine lenses comprises of three groups of three lenses, wherein two of said three lenses are used for producing a low-intensity portion of said spread component of said desired beam pattern, and one of said three lenses of each group is used for producing a high-intensity portion of said spread component of said desired beam pattern.

7. The headlamp system for a vehicle of claim 1, wherein said first lens system further comprises at least one D-optic.

8. The headlamp system for a vehicle of claim 1, wherein said at least one first light source and said at least one second light source are selectively illuminated or extinguished to form said desired beam pattern.

9. The headlamp system for a vehicle of claim 8, wherein said desired beam pattern is selected from the group consisting of a low beam pattern, a high beam pattern, and combinations thereof.

10. The headlamp system for a vehicle of claim 8, said at least one first light source further comprising a first plurality of light sources, and said at least one second light source further comprising a second plurality of light sources, wherein additional light sources of said second plurality of light sources is illuminated to produce at least one steering hot spot in addition to said desired beam pattern.

11. The headlamp system for a vehicle of claim 10, wherein the number of said steering hot spots produced in addition to said desired beam pattern is dependent upon a parameter selected from the group consisting of the operating speed of the vehicle, the position of the steering wheel of the vehicle, and combinations thereof.

12. The headlamp system for a vehicle of claim 1, wherein said at least one second light source is mounted on a common substrate.

13. A headlamp system for a vehicle, comprising:
a first group of light sources;
a first lens system operably associated with said first group of light sources, wherein light from said first group of light sources emitted through said first lens system produces a spread component of a desired beam pattern;
a second group of light sources;
at least one light transfer device, operably associated with said second group of light sources; and
a second lens system for receiving light transferred through said at least one light transfer device from said second group of light sources, wherein light emitted from said second group of light sources is directed to said second lens system by said at least one light transfer device, and light transferring through said at least one light transfer device and passing through said second lens system forms a hot spot component of said desired beam pattern;
wherein a portion of said second group of light sources provides a high-intensity portion of said hot spot component of said desired beam pattern, and a portion of said second group of light sources forms low-intensity portion of said hot spot component of said desired beam pattern.

14. The headlamp system for a vehicle of claim 13, further comprising:
a holder for supporting said at least one light transfer device;
a retainer for positioning said at least one light transfer device onto said holder, said retainer connected to said holder; and
a substrate, said second group of light sources being mounted on said substrate, wherein said holder is mounted on said substrate in proximity to said second group of light sources.

15. The headlamp system for a vehicle of claim 13, said at least one light transfer device further comprising a plurality of light pipes, each of said plurality of light pipes aligned with one of said second group of light sources, wherein said plurality of light pipes receives light from each of said second group of light sources.

16. The headlamp system for a vehicle of claim 13, wherein each of said second group of light sources is a light emitting diode (LED).

17. The headlamp system for a vehicle of claim 13, said first lens system further comprising a plurality of lenses, said first group of light sources further divided into multiple groups of light sources, each of said multiple groups of light sources having an equal amount of light sources, each of said multiple groups of light sources being mounted on a substrate, and each of said plurality of lenses from said first lens system is operably associated with one light source selected from said first group of light sources.

18. The headlamp system for a vehicle of claim 17, further comprising one lens from said plurality of lenses operably associated with one light source of said multiple groups of light sources to form a high-intensity portion of said spread component of said desired beam pattern, and at least two of said lenses from said first lens system operably associated with each of said multiple groups of light sources to form a low-intensity portion of said spread component of said desired beam pattern.

19. The headlamp system for a vehicle of claim 13, said first lens system further comprising at least one D-optic.

20. The headlamp system for a vehicle of claim 13, each of said first group of light sources and said second group of light sources further comprising a light emitting diode (LED).

21. A headlamp system for a vehicle, comprising:
a first series of light emitting diodes having nine light emitting diodes divided evenly into three groups of light emitting diodes;
a plurality of lenses operably associated with said first series of light emitting diodes such that light passing through said plurality of lenses from said first series of light emitting diodes forms a spread component of a desired beam pattern;
a second series of light emitting diodes;
a series of light transfer devices operably associated with said second series of light emitting diodes; and
at least one lens for receiving light from said series of light transfer devices such that light passing through said at least one lens from said series of light transfer devices forms a hot spot component of said desired beam pattern;
wherein two of said three light emitting diodes in one of said three groups of light emitting diodes provide a low-intensity portion of said spread component of said desired beam pattern, and one of said three light emitting diodes in one of said three groups of light emitting diodes provides a high-intensity portion of said spread beam component of said desired beam pattern.

22. The headlamp system for a vehicle of claim 21, further comprising:
a substrate for supporting said second series of light emitting diodes;
a holder mounted to said substrate such that said holder supports said series of light transfer devices; and a retainer connected to said holder such that said retainer positions said series of light transfer devices in proximate relationship to said second series of light emitting diodes.

23. The headlamp system for a vehicle of claim 21, said series of light transfer devices further comprising a plurality of light pipes, wherein each of said series of said light pipes receives light from each of said second series of light emitting diodes.

24. The headlamp system for a vehicle of claim 21, further comprising each of said plurality of lenses to be aligned with one of said first series of light emitting diodes.

25. The headlamp system for a vehicle of claim 21, each of said plurality of lenses further comprising a D-optic.

26. The headlamp system for a vehicle of claim 21, further comprising a portion of said first series of light emitting diodes form a high-intensity portion of said spread component of said desired beam pattern, and a portion of said first series of light emitting diodes forms a low-intensity portion of said spread component of said desired beam pattern.

27. The headlamp system for a vehicle of claim 21, further comprising a portion of said second series of light emitting diodes form a high-intensity portion of said hot spot component of said desired beam pattern, and a portion of said second series of light emitting diodes forms a low-intensity portion of said hot spot component of said desired beam pattern.

28. A headlamp system for a vehicle, comprising:
a first group of light sources;
a first lens system operably associated with said first group of light sources, wherein light from said first group of light sources emitted through said first lens system produces a spread component of a desired beam pattern, said first lens system including a plurality of lenses, said first group of light sources further divided into multiple groups of light sources, each of said multiple groups of light sources having an equal amount of light sources, each of said multiple groups of light sources being mounted on a substrate, and each of said plurality of lenses from said first lens system is operably associated with one light source selected from said first group of light sources;
a second group of light sources;
at least one light transfer device, operably associated with said second group of light sources; and
a second lens system for receiving light transferred through said at least one light transfer device from said second group of light sources, wherein light emitted from said second group of light sources is directed to said second lens system by said at least one light transfer device, and light transferring through said at least one light transfer device and passing through said second lens system forms a hot spot component of said desired beam pattern;
wherein one lens from said plurality of lenses is operably associated with one light source of said multiple groups of light sources to form a high-intensity portion of said spread component of said desired beam pattern, and at least two of said lenses from said first lens system operably associated with each of said multiple groups of light sources to form a low-intensity portion of said spread component of said desired beam pattern.

29. The headlamp system for a vehicle of claim 28, further comprising:
a holder for supporting said at least one light transfer device;
a retainer for positioning said at least one light transfer device onto said holder, said retainer connected to said holder; and
a substrate, said second group of light sources being mounted on said substrate, wherein said holder is mounted on said substrate in proximity to said second group of light sources.

30. The headlamp system for a vehicle of claim 28, said at least one light transfer device further comprising a plurality of light pipes, each of said plurality of light pipes aligned with one of said second group of light sources, wherein said plurality of light pipes receives light from each of said second group of light sources.

31. The headlamp system for a vehicle of claim 28, wherein each of said second group of light sources is a light emitting diode (LED).

32. The headlamp system for a vehicle of claim 28, wherein a portion of said second group of light sources provides a high-intensity portion of said hot spot component of said desired beam pattern, and a portion of said second group of light sources forms low-intensity portion of said hot spot component of said desired beam pattern.

33. The headlamp system for a vehicle of claim 28, said first lens system further comprising at least one D-optic.

34. The headlamp system for a vehicle of claim 28, each of said first group of light sources and said second group of light sources further comprising a light emitting diode (LED).

35. A headlamp system for a vehicle, comprising:
a first series of light emitting diodes;
a plurality of lenses operably associated with said first series of light emitting diodes such that light passing through said plurality of lenses from said first series of light emitting diodes forms a spread component of a desired beam pattern, and a portion of said first series of light emitting diodes form a high-intensity portion of said spread component of said desired beam pattern, and a portion of said first series of light emitting diodes forms a low-intensity portion of said spread component of said desired beam pattern;
a second series of light emitting diodes;
a series of light transfer devices operably associated with said second series of light emitting diodes; and
at least one lens for receiving light from said series of light transfer devices such that light passing through said at least one lens from said series of light transfer devices forms a hot spot component of said desired beam pattern.

36. The headlamp system for a vehicle of claim 35, further comprising:
a substrate for supporting said second series of light emitting diodes;
a holder mounted to said substrate such that said holder supports said series of light transfer devices; and
a retainer connected to said holder such that said retainer positions said series of light transfer devices in proximate relationship to said second series of light emitting diodes.

37. The headlamp system for a vehicle of claim 35, said series of light transfer devices further comprising a plurality of light pipes, wherein each of said series of said light pipes receives light from each of said second series of light emitting diodes.

38. The headlamp system for a vehicle of claim 35, further comprising each of said plurality of lenses to be aligned with one of said first series of light emitting diodes.

39. The headlamp system for a vehicle of claim 38, further comprising said first series of light emitting diodes to be comprised of nine light emitting diodes divided evenly into three groups of light emitting diodes.

40. The headlamp system for a vehicle of claim 39, wherein two of said three light emitting diodes in one of said three groups of light emitting diodes provide a low-intensity portion of said spread component of said desired beam pattern, and one of said three light emitting diodes in one of said three groups of light emitting diodes provides a high-intensity portion of said spread beam component of said desired beam pattern.

41. The headlamp system for a vehicle of claim 35, each of said plurality of lenses further comprising a D-optic.

42. The headlamp system for a vehicle of claim 35, further comprising a portion of said second series of light emitting diodes form a high-intensity portion of said hot spot component of said desired beam pattern, and a portion of said second series of light emitting diodes forms a low-intensity portion of said hot spot component of said desired beam pattern.

43. A headlamp system for a vehicle, comprising:
- a first series of light emitting diodes;
- a plurality of lenses operably associated with said first series of light emitting diodes such that light passing through said plurality of lenses from said first series of light emitting diodes forms a spread component of a desired beam pattern;
- a second series of light emitting diodes;
- a series of light transfer devices operably associated with said second series of light emitting diodes; and
- at least one lens for receiving light from said series of light transfer devices such that light passing through said at least one lens from said series of light transfer devices forms a hot spot component of said desired beam pattern;
- wherein a portion of said second series of light emitting diodes form a high-intensity portion of said hot spot component of said desired beam pattern, and a portion of said second series of light emitting diodes forms a low-intensity portion of said hot spot component of said desired beam pattern.

44. The headlamp system for a vehicle of claim 43, further comprising:
- a substrate for supporting said second series of light emitting diodes;
- a holder mounted to said substrate such that said holder supports said series of light transfer devices; and
- a retainer connected to said holder such that said retainer positions said series of light transfer devices in proximate relationship to said second series of light emitting diodes.

45. The headlamp system for a vehicle of claim 43, said series of light transfer devices further comprising a plurality of light pipes, wherein each of said series of said light pipes receives light from each of said second series of light emitting diodes.

46. The headlamp system for a vehicle of claim 43, further comprising each of said plurality of lenses to be aligned with one of said first series of light emitting diodes.

47. The headlamp system for a vehicle of claim 46, further comprising said first series of light emitting diodes to be comprised of nine light emitting diodes divided evenly into three groups of light emitting diodes.

48. The headlamp system for a vehicle of claim 47, wherein two of said three light emitting diodes in one of said three groups of light emitting diodes provide a low-intensity portion of said spread component of said desired beam pattern, and one of said three light emitting diodes in one of said three groups of light emitting diodes provides a high-intensity portion of said spread beam component of said desired beam pattern.

49. The headlamp system for a vehicle of claim 43, each of said plurality of lenses further comprising a D-optic.

50. The headlamp system for a vehicle of claim 43, further comprising a portion of said first series of light emitting diodes form a high-intensity portion of said spread component of said desired beam pattern, and a portion of said first series of light emitting diodes forms a low-intensity portion of said spread component of said desired beam pattern.

* * * * *